(12) United States Patent
Fu et al.

(10) Patent No.: US 6,505,520 B1
(45) Date of Patent: Jan. 14, 2003

(54) METHOD FOR PREPARING A THERMAL PULSED MICRO FLOW SENOR

(75) Inventors: Chien-Chung Fu, Hsinchu (TW); Cheng-Kuo Lee, Hsinchu (TW); Ching-Yi Wu, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/235,301

(22) Filed: Jan. 22, 1999

(51) Int. Cl.$^7$ .............................................. G01F 1/708
(52) U.S. Cl. ................................................. 73/861.95
(58) Field of Search ........................... 73/861.95, 204.11

(56) References Cited

U.S. PATENT DOCUMENTS 6,289,746 B1 * 9/2001 Fu et al. .................. 73/861.95

* cited by examiner

Primary Examiner—Robert Raevis
(74) Attorney, Agent, or Firm—Bacon & Thomas, PLLC

(57) ABSTRACT

Disclosed is a method for preparing a thermal pulsed micro flow sensor comprising determining positions to allocate a plurality of thermal sensors along a microchannel, relatively to a heater positioned in said microchannel, and positioning said thermal sensors at the determined positions, respectively. In the invented flow sensor, the distance ($L_n$) between the thermal sensor ($S_o$) nearest to the thermal sensors ($S_n$) is determined according to the following equation:

$$\Delta F = (A * L_n) * \{1/T_n - 1/(T_n + \Delta T)\};$$

wherein $\Delta F$ represents accuracy in velocity measurement; A represents cross sectional area of the fluid channel; $T_n$ is flying time and $T_n = (A * L_n)/F$ wherein F represents full scale of measurable velocity of no thermal sensor and n represents number of thermal sensor counting from the most downstream one; and $\Delta T$ represents tolerance of the thermal pulse signals;

3 Claims, 8 Drawing Sheets

METHOD FOR PREPARING A THERMAL PULSED MICRO FLOW SENOR

FIELD OF THE INVENTION

The present invention pertains to a method for preparing a thermal pulsed micro flow sensor, especially to a method for preparing a thermal pulsed micro flow sensor comprising a heater and a plurality of thermal sensors.

BACKGROUND OF THE INVENTION

Along with the tremendous developments in the micromachining technology, the measurement of micro velocities has become an important technology. Among the measurement technologies, the "thermal pulsed micro flow sensor" is widely used in measuring the velocity of a flow in a microchannel.

A conventional thermal pulsed micro flow sensor measures the velocity of a flow according to the "flying time" of a thermal pulse from one point to another. During the measurement, a heater generates a thermal pulse and outputs it to a flowing fluid. While the fluid flows, the thermal pulse is carried by the fluid along a fluid channel. Two thermal sensors are used to sense the flying time of the thermal pulse between them. Since the velocity of the fluid is in inverse proportion to the flying time of the thermal pulse, the velocity may be easily measured from the flying time.

Figure 1:
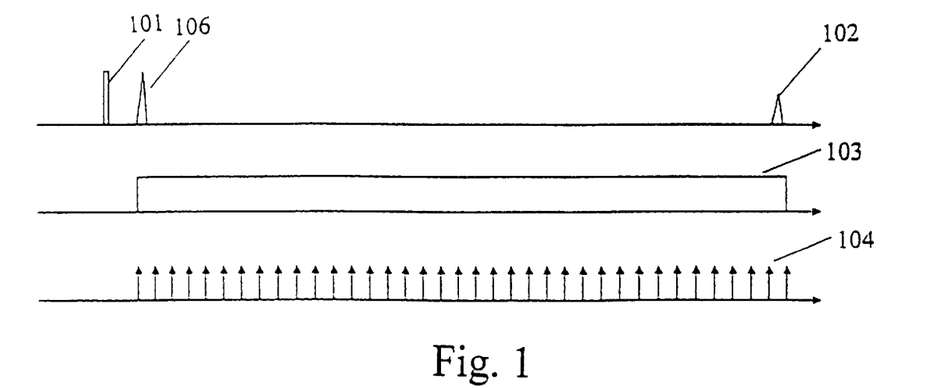
FIG. 1 illustrates the principal of velocity measurement used in a thermal pulsed micro flow sensor.

FIG. 1 illustrates the principal of velocity measurement used in a thermal pulsed micro flow sensor. As shown in this figure, a thermal pulse 101 is carried by a fluid flow F. The thermal pulse 101 travels through two thermal sensors and thus two thermal signals 102 and 106 are generated by the sensors separately. The time difference 103 of the two thermal signals 102 and 106 is counted based on a working frequency 104. Velocity of the fluid flow is calculated according to the following equation:

$$F=K*(A*L)/T=K*V/T \tag{1}$$

In this equation, F represents velocity of the fluid, K represents a calibration factor, A represents the cross sectional area of the microchannel, L represents the distance between the two thermal sensors, T represents time difference between the two thermal signals, i.e., the flying time of the thermal pulse, and V represents volume of the microchannel between the two thermal sensors.

The measurement of micro flows adopting thermal pulses has been disclosed by Harrington et al., in their U.S. Pat. No. 4,782,708 in 1988. In the Harrington invention, disclosed was a micro flow sensor with thermal pulses generated by a resistor driven by an oscillator current source. Two thermal couplers are used to generate respective thermal signals when a thermal pulse generated by the heater passes them, respectively. The time difference of the two thermal signals is measured so that the velocity of the flow may be known.

In 1993 Erskine et al. disclosed a micro flow sensor in their U.S. Pat. No. 5,243,858. In the Erskine invention, only one thermal sensor made of thermister is used. The flying time of the thermal pulse from the heater and the thermal sensor is measured. Velocity of the flow is calculated according to the flying time difference. In order to improve the accuracy in the measurement, two sets of flow sensors are arranged normally to each other. The two-dimensional flow rate of the microchannel is then taken for consideration.

In the above thermal pulsed micro flow sensors, measurements are based on the flying time of the thermal pulses. As a result, the ambient temperature won't affect the accuracy of the measurement. This approach is suited in cases where viscosity or thermal properties of the fluid varies from time to time, or where particles are carried in the fluid, such as in the blood.

In order to maintain the performance of a thermal pulsed micro flow sensor, the thermal pulse 101 shall have a certain level of amplitude and a sufficient width. This is because a pulse attenuates during the flow. In addition to this, variations in thermal conductivity or in flow will bring distortions into the pulse. These and other factors influences the accuracy of measurement of the micro flow.

Figure 1A:
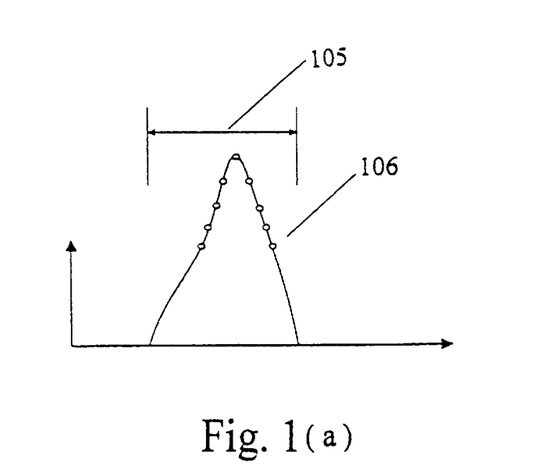
FIG. 1a illustrates the relation between a thermal signal and the resolution in measurement in a thermal pulsed micro flow sensor.

FIG. 1a illustrates the relation between a thermal signal and the accuracy of measurement in a thermal pulsed micro flow sensor. In this figure, 105 represents width of a pulse 101 after being distorted. Accuracy in sensing the distortion and in picking-up the signals is limited to approximately the average width of the thermal pulses. In general case, the width is about 70–100 $\mu$s.

On the other hand, requirements for a measurement instrument include: broader measurable scale, high resolution and short response time. These requirements are in conflict with the said limitation of accuracy. Solutions to such conflict has then become a major task in the thermal pulsed micro flow sensor.

Figure 2:
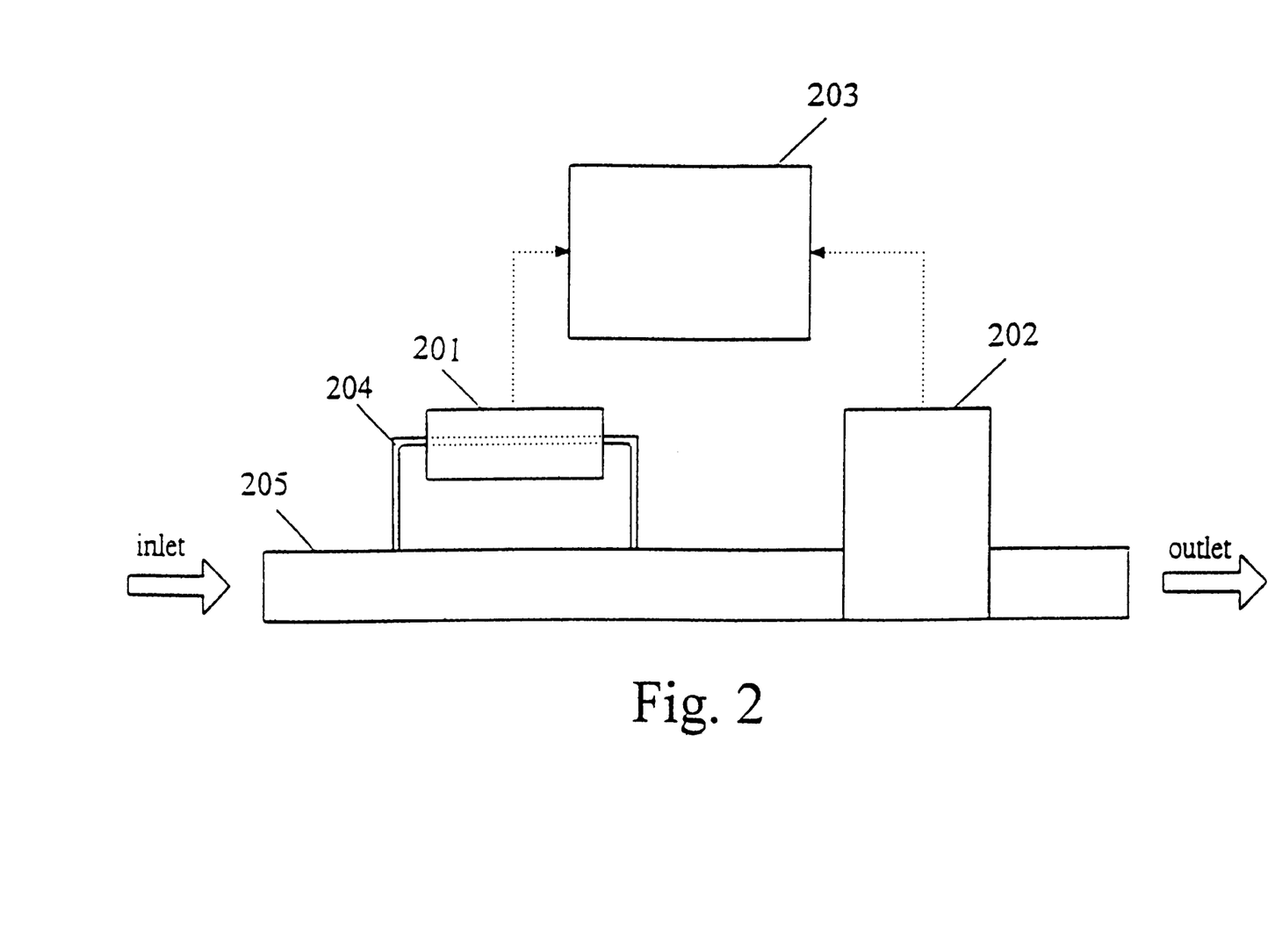
FIG. 2 illustrates the structure of a mass flow controller adopting a thermal pulsed micro flow sensor.

Take a mass flow controller adopting a thermal pulsed micro flow sensor as an example. FIG. 2 illustrates the structure of such a mass flow controller. As shown in this figure, a mass flow controller of this kind generally includes a fluid channel 203, a bypass microchannel 204, a flow sensor 201, a controller 203 and a microvalve 202. When a fluid is introduced into the fluid channel 205, a portion of the fluid enters microchannel 204. Flow sensor 201 measures the velocity of the fluid and outputs the velocity to controller 203. Controller 203 controls the velocity by adjusting microvalve 202 according to the velocity so measured.

In a mass flow controller as described above, requirements include accuracy of control to be 0.05% the full scale of the flow and response time to be under 0.5 sec. If full scale of the flow is 200 sccm, accuracy should be 0.1 sccm. While the "response time" shall include operation time consumed in the controller 203, the response time of the flow sensor should be under 0.25 sec.

Figure 3:
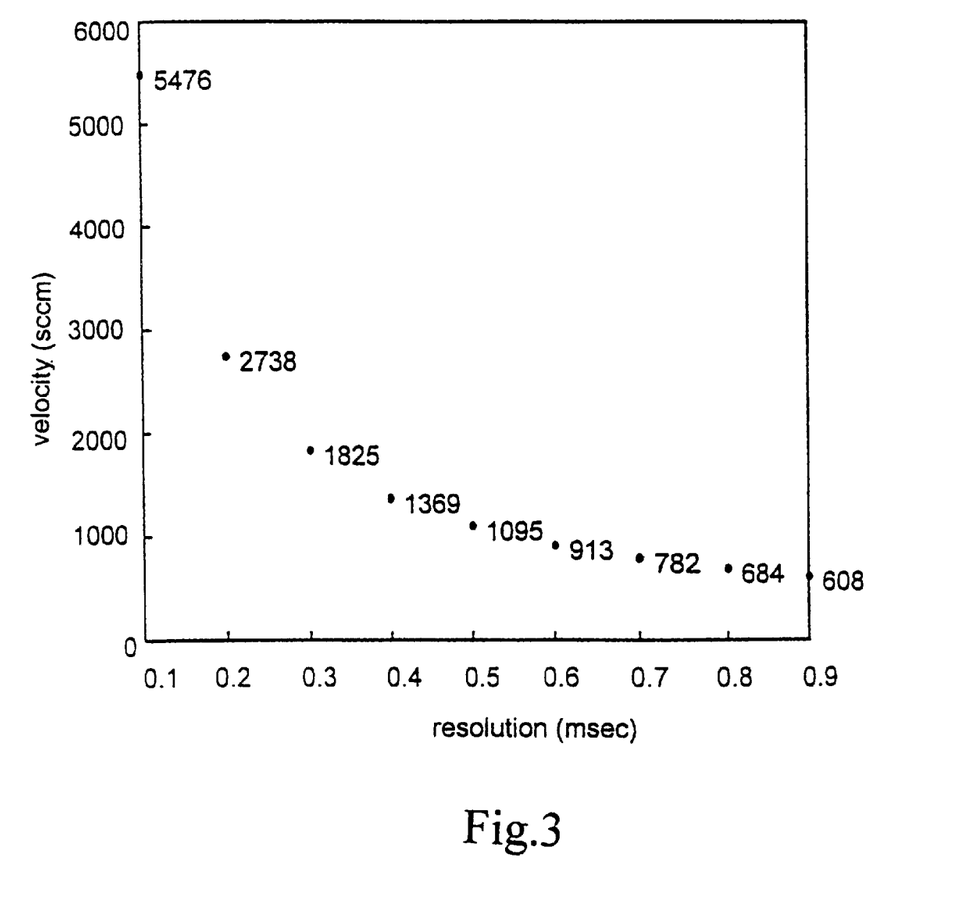
FIG. 3 illustrates the relation between measured velocity and resolution in a thermal pulsed micro flow sensor with 600:1 bypass ratio.

FIG. 3 illustrates the relation between measured velocity and resolution in a thermal pulsed micro flow sensor with 600:1 bypass ratio. As shown in this figure, when the measurable scale of a flow sensor is expanded, its resolution will be decreased. If requirement in accuracy is 0.1 sccm, measurable scale of the flow sensor will be limited to under 23.3 sccm. It is possible to expand the measurable scale by expanding the sectional area of the microchannel. This, however, will lengthen the reaction time because of lower resolution, especially when flow speed is relatively low.

In order to solve the conflict, disclosed was an improved flow sensor in U.S. Pat. No. 5,533,412 (Jerman et al.) wherein the bypass channel has several sections, each section having different cross sectional area. Several thermal sensors are positioned in each section respectively. When the flow speed is higher, thermal sensors in a section with larger cross sectional area are used. And vice versa.

The flow sensor disclosed by Jerman et al. may be applied to a variety of velocities. It, however, has several drawbacks. First, due to the design of the multiple sections, the space required for a flow sensor will be expanded. The flow sensor so prepared will then be bulky and its manufacture cost is increased. As the cross sectional area of every section is different from that of others, sizes of heaters and thermal sensors shall be adjusted from section to section. This will bring difficulties in the manufacture process. Last but not least, since size of heaters and thermal sensors varies from section to section, special circuit is required to solve the difference in resistance in each section. Design of the flow sensor will thus become complex.

It is thus a need in the industry to have a simplified micro flow sensor that is applicable to a relatively larger scope of measurement, while its. resolution in measurements may be maintained. It is also a need to have a novel method to prepare a micro flow sensor with these advantages.

OBJECTIVE OF THE INVENTION

The purpose of this invention is to provide a method for preparing a simplified thermal pulsed micro flow sensor.

Another purpose of this invention is to provide a method for preparing a thermal pulsed micro flow sensor that is applicable to relatively larger scope of measurement, while its resolution in measurements may be maintained.

Another purpose of this invention is to provide a novel design of a thermal pulsed micro flow sensor.

SUMMARY OF THE INVENTION

According to the thermal pulsed micro flow sensor of this invention, a plurality of thermal sensors are used to measure the flying time of thermal pulses generated by a heater. The thermal sensors are aligned along a microchannel with different distances from the heater. A method to determine positions of the thermal sensors is disclose where requirements for resolution, errors in thermal pulses, maximum response time and minimum measurable scales are taken as factors in determining said positions. Position of the most downstream thermal sensor is first decided. Positions of thermal sensors next to an already determined thermal sensor are decided in sequence.

These and other objectives and advantages of this invention will be clearly understood from the detailed description by referring to the following drawings.

DETAILED DESCRIPTION OF THE INVENTION

Figure 4:
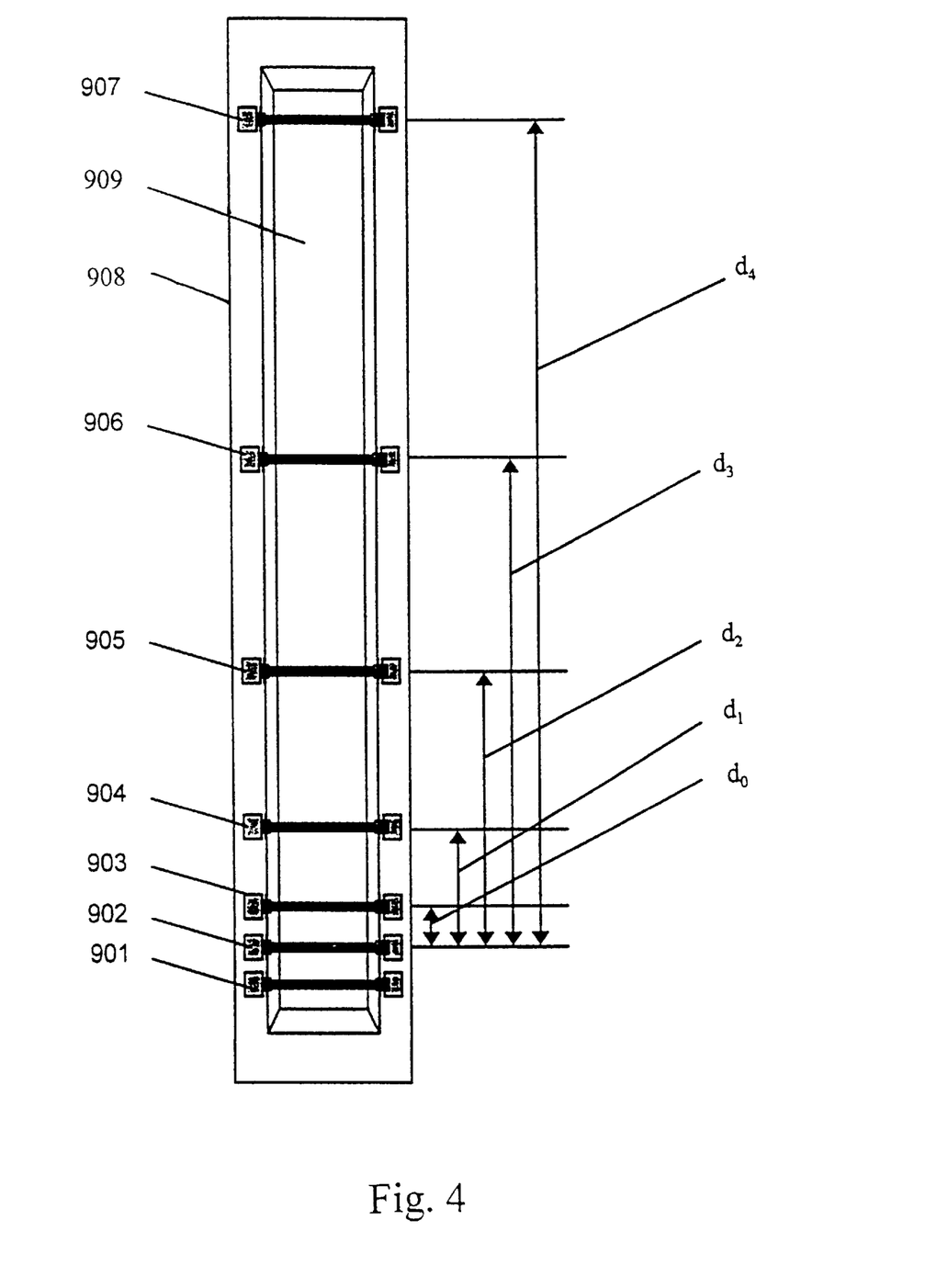
FIG. 4 illustrates the plan view of an embodiment of the thermal pulsed micro flow sensor prepared according to the method of the invention.

The following is a detailed description of the embodiments of the method for preparing a thermal pulsed micro flow sensor of this invention. Refer to FIG. 4. FIG. 4 illustrates the plan view of an embodiment of the thermal pulsed micro flow sensor, prepared according to the method of the invention.

As shown in this figure, the thermal pulsed micro flow sensor of this invention includes: a substrate 908, a microchannel 909 positioned in said substrate 908, and a heater 901 and 6 thermal sensors 902, 903, 904, 905, 906 and 907, all positioned in said microchannel 909. Material of the substrate 908 may be metal, resin or other polymer, or semiconductor. In this embodiment, the substrate 908 is a silicon wafer or a silicon dice such that the flow sensor may be integrated and prepared with the semiconductor manufacture process. The microchannel 909 may be prepared by etching the substrate 908 or injecting or pressing a substrate material with a mold. Material for the heater 901 may be platinum or other heat generating material. If platinum is applied, heater 901 may be prepared with the semiconductor manufacture technology. Suited material for the thermal sensors 902–907 includes platinum, polysilicon, nickel and other materials that are suited in the semiconductor manufacture technology.

During the measurement, a thermal pulse is generated by the heater 901. The thermal pulse is carried along microchannel 909, by a fluid flow F inside the microchannel 909. Each of thermal sensors 902–907 generates a thermal signal, when the thermal pulse reaches it, since its resistance changes due to change of its temperature caused by the thermal pulse.

Figure 5:
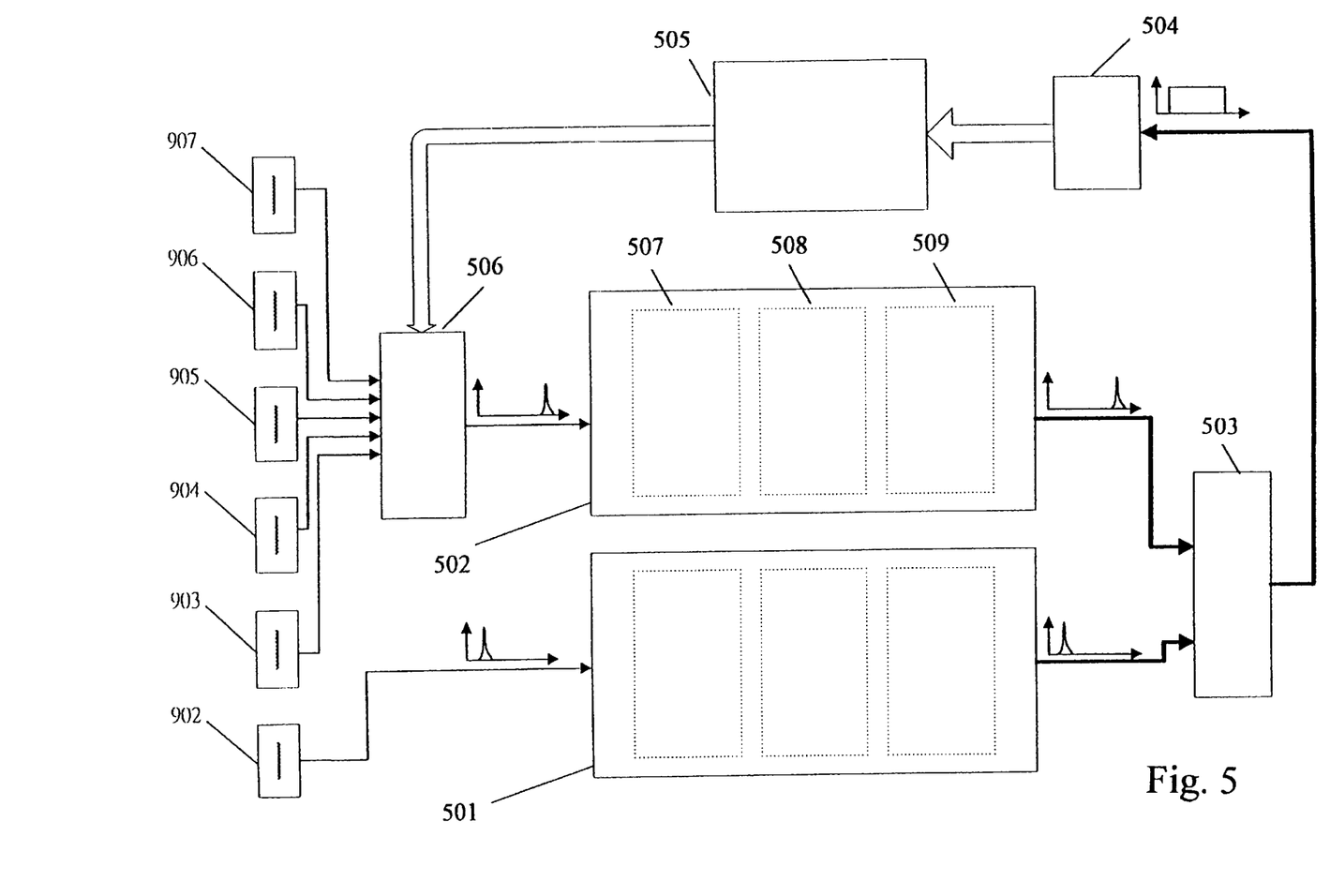
FIG. 5 illustrates the circuit diagram of a signal processing circuit suited in the thermal pulsed micro flow sensor of FIG. 4.

FIG. 5 illustrates the circuit diagram of a signal processing circuit suited in the thermal pulsed micro flow sensor of FIG. 4. As shown in this figure, the signal processing circuit includes: a heater 901, a plurality of thermal sensors 902, 903, 904, 905. 906 and 907, a multiplexer 506, thermal signal processors 501 and 502, a flying time calculator 503, a timer 504, and a microprocessor 505.

When heater 901 generates a thermal pulse, the pulse is sensed first by thermal sensor 902 and thermal sensor 902 generates a thermal signal to thermal signal processor 501. Multiplexer 506 selects a thermal sensor (e.g., 907) from among thermal sensors 903–907 so that when the thermal pulse reaches the selected thermal sensor 907, a thermal signal is generated by the thermal sensor 907 and output to thermal signal processor 502. The flying time between thermal sensors 902 and 907 may be measured by flying time calculator 503 according to thermal signals processed by thermal signal processors 501 and 502. As the cross sectional area of the microchannel 909 and the distance between thermal sensors 902 and 907 are already known, the velocity of the fluid flow may be calculated according to the above equation (1).

In the circuit as described above, each of thermal signal processors 501 and 502 may include a reference power source 507 to provide a constant current so that when the resistance of a thermal sensor is changed, a corresponding change of voltage may be generated; an amplifier circuit 508 to convert changes of voltage into signals; and a noise processor 509 to improve the S/N ratio of the signal. Time difference calculator 503 includes two D-type flip-flops, to convert time difference between signals generated by thermal signal processor 501 and by 502 into flying. time signals. The flying time signals may be standard TTL signals so that they may be processed by timer 504. Length of the flying time signal may be substantially equal to the time difference between signals generated by thermal signal processors 501 and 502. Timer 504 measures length of a flying time signal generated by flying time processor 503 and convert it into a digital format. The flying time in digital format is processed by microprocessor 505. Timer 504 may be a timer integrated in microprocessor 505 or a stand-along timer, e.g., an 8254 timer. Microprocessor 505 calculates velocity of the fluid flow according to the flying time. Microprocessor 505 is also capable of selecting a suited thermal sensor from among thermal sensors 903–907 through multiplexer 506.

In the flow sensor described above, distances between thermal sensors 903, 904, 905, 906 and 907 and thermal sensor 902 $d_1$, $d_2$, $d_3$, $d_4$ and $d_5$ (referring to FIG. 4), are major factors in determining measurable scopes of the flow sensor. One focus of this invention is to determine these distances.

The following is a detailed description of the method for preparing a thermal pulsed micro flow sensor of this invention. A thermal pulsed micro flow sensor with the following conditions will be taken for example, for purpose of demonstration.

Suppose the cross sectional area of the microchannel 909 is $1.15*10^{-7}$ m$^2$ and tolerance for the thermal signals is 100 $\mu$s. Requirements of a flow sensor are:

Full scale: 200 sccm.
Accuracy of measurement: 0.05% the full scale, 0.1 sccm.
Response time: 0.25 sec.
Bypass ratio: 600:1.

Figure 6:
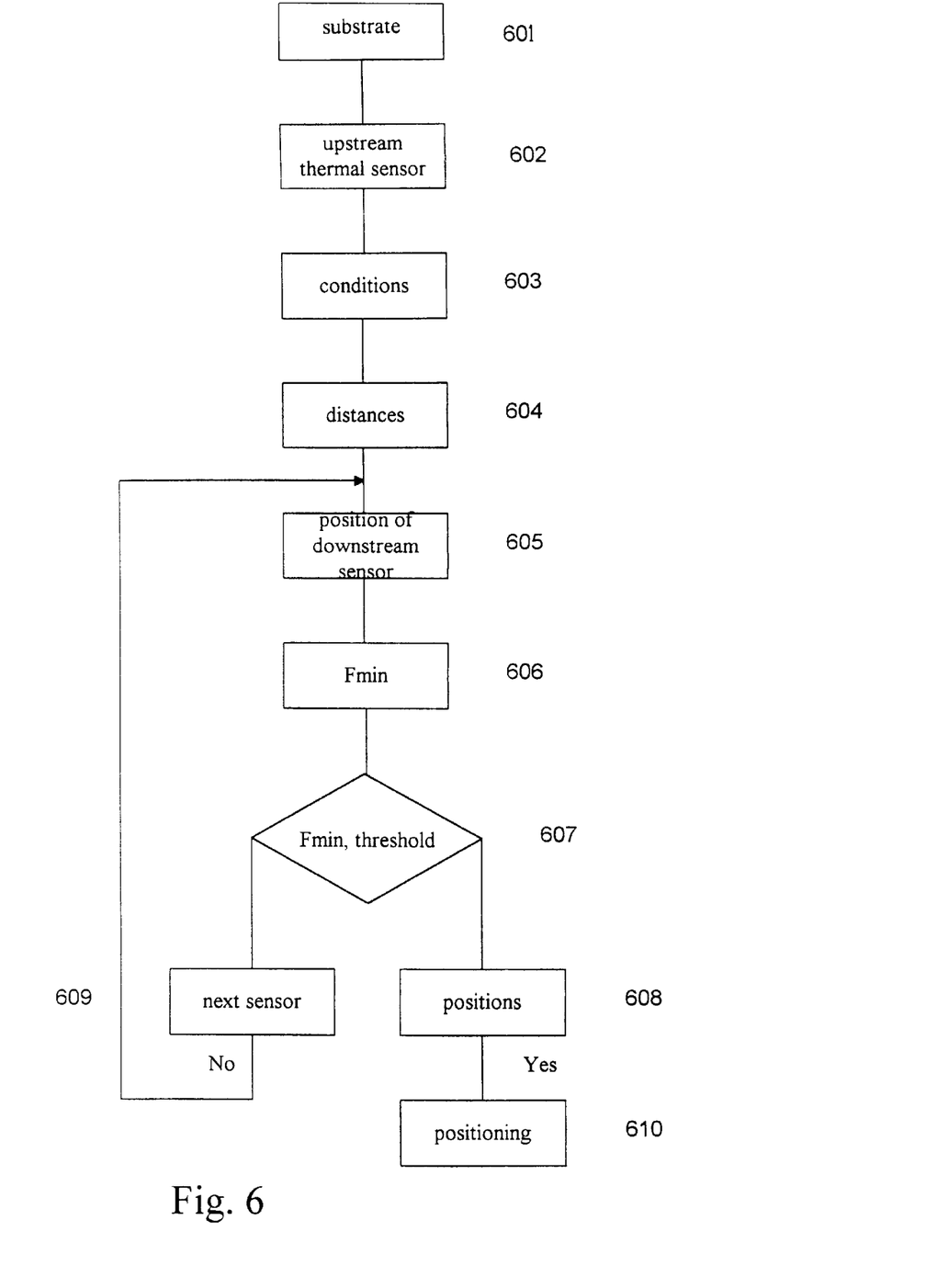
FIG. 6 illustrates the flow chart of the determination of positions of thermal sensors applicable to this invention.

Under these conditions, the positions of the thermal sensors 903–907 may be determined. FIG. 6 illustrates the flow chart of the determination of positions of thermal sensors in this embodiment.

As shown in this figure, at 601 a substrate provided with a microchannel is prepared. At 602 position of a most upstream thermal sensor 902 is decided randomly. At 603 conditions in determining positions of the most downstream thermal sensors 907 are taken. These conditions include full scale, accuracy, maximum response time, bypass ratio etc., and number of thermal sensors.

Later, at 604, the distance between the most upstream thermal sensor 902 and the most downstream thermal sensor 907, $L_1$ is determined. $L_1$ may be decided by the full scale and the accuracy of measurement, as follows:

$$\Delta F = (A*L_n)*\{1/T_n - 1/(T_n + \Delta T)\}; \qquad (2)$$

wherein $\Delta F$ represents accuracy in velocity measurement (0.1 sccm); A represents cross sectional area of the fluid channel ($1.15*10^{-7}$ m$^2$); $T_n$ is flying time and $T_n = (A*L_n)/F$ wherein F represents full scale of measurable velocity of thermal sensor 907 (200 sccm) and n represents number of thermal sensor counting from the most downstream one; and $\Delta T$ represents tolerance of the thermal pulse signals (100 $\mu$s).

Figure 7:
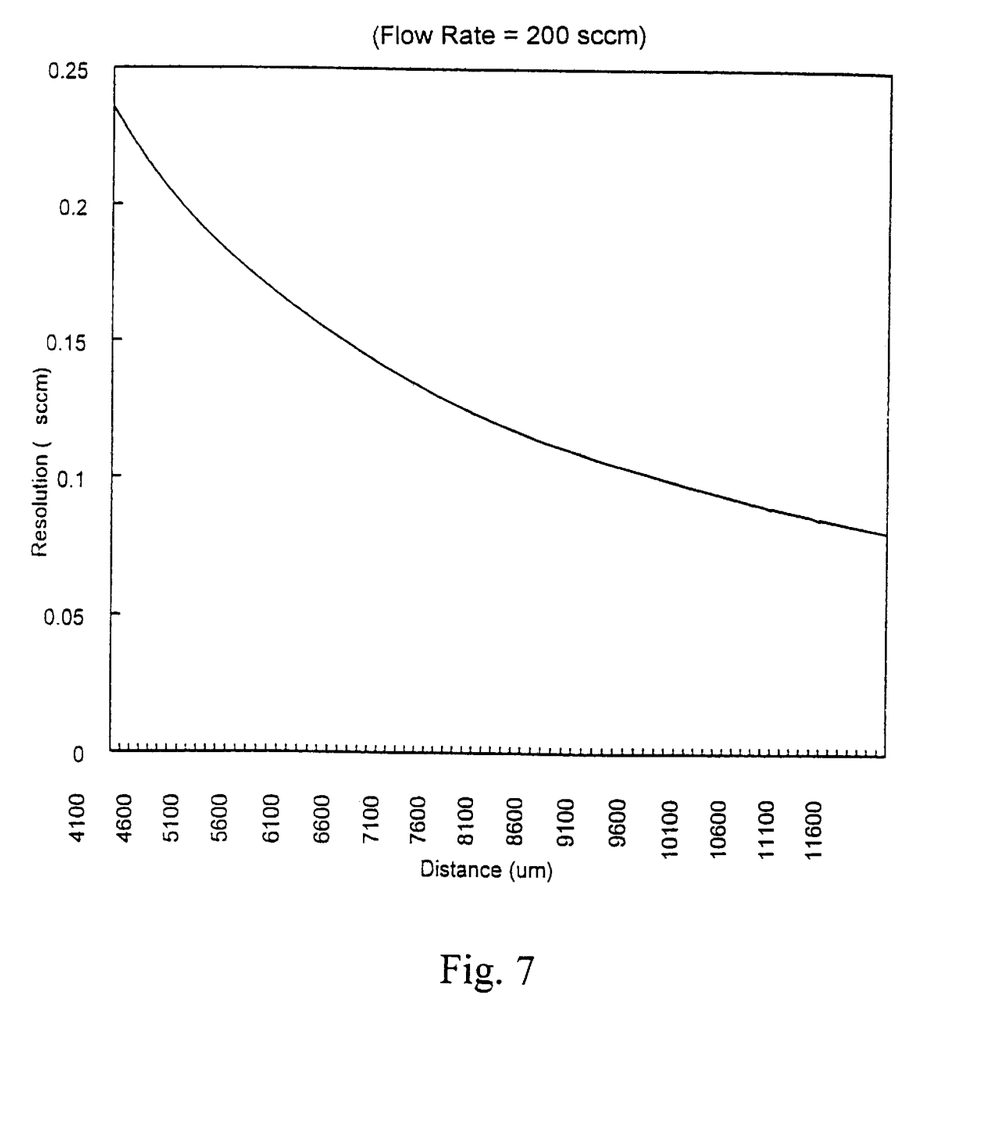
FIG. 7 illustrates the relation between distances of thermal sensors and resolutions of measurements, under the velocity of 200 sccm.

FIG. 7 illustrates the relation between distances of thermal sensors and resolutions of measurements, under the velocity of 200 sccm. As shown in this figure, the longer the distance between two thermal sensors is, the higher the resolution of measurement will be. In order to enhance the resolution of measurement, at 605, the shortest distance within a required resolution is selected. In this embodiment, the value is 9680 $\mu$m. This value represents the distance between the most upstream thermal sensor 902 and the most downstream thermal sensor 907.

Later, at 606, the minimum measurable velocity of thermal sensor 907 is calculated. Since the required maximum response time is 0.25 sec, the minimum measurable velocity of thermal 907, $F_1$min, may be decided as follows:

$$F_n\text{min} = (A*L_n)/R; \qquad (3)$$

Wherein R represents the required maximum response time, 0.25 sec. Because R=0.25 sec, Fmin=160.3 sccm. It is obvious that thermal sensor 907 is not applicable in measuring velocity slower than 160.3 sccm. At 607 $F_1$min is compared with a threshold to decide whether it is necessary to have another thermal sensor that is applicable to a slower scale of velocity.

If the decision is negative, at 608, the positions of thermal sensors are decided. Otherwise, at 609, position for a second thermal sensor 906 that is applicable to a slower scale of velocity is determined by repeating steps 605 to 607. When step 604 is repeated, the full scale F shall be replaced by the minimum measurable velocity $F_1$min of a formerly decided thermal sensor. In step 608 an adjustment factor may be added so that measurable scopes of two neighbor thermal sensors may overlap.

The above steps may be operated by a computer or a microprocessor automatically. Table I illustrates results in determining positions of six thermal sensors by a computer. From this table we have:

Distance between thermal sensors 902 and 907: 9680 $\mu$m, to measure the scope from 200.0–160.3 sccm.

Distance between thermal sensors 902 and 906: 6220 $\mu$m, to measure the scope from 160.2–103.0 sccm.

Distance between thermal sensors 902 and 905: 2580 $\mu$m, to measure the scope from 103.0–42.7 sccm.

Distance between thermal sensors 902 and 904: 460 $\mu$m, to measure the scope from 42.7–7.6 sccm.

Distance between thermal sensors 902 and 903: 20 $\mu$m, to measure the scope under 7.6 sccm.

At 610, thermal sensors 902–907 are positioned at the determined positions respectively. The fixations of the thermal sensors may be bonding, vaporization or any applicable methods. The product so prepared may be further bonded with a heater and necessary processing circuits and power supply to function as an integrated micro flow sensor.

Figure 8:
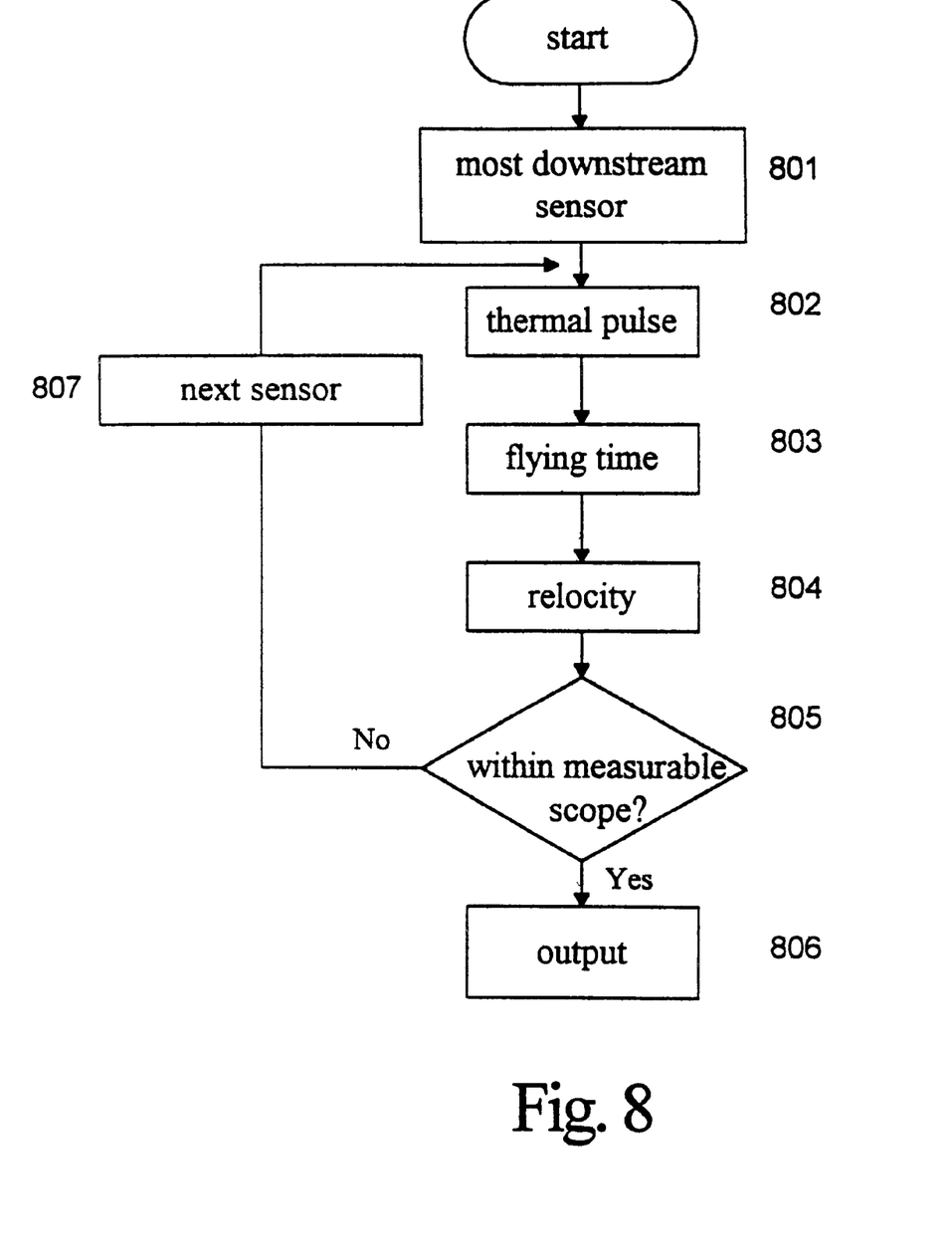
FIG. 8 illustrates the flow chart of signal processing of one embodiment of the thermal pulsed micro flow sensor of this invention.

FIG. 8 illustrates the flow chart of signal processing of one embodiment of the thermal pulsed micro flow sensor of this invention. As shown in this figure, in the measurement of a velocity, at 801 the most downstream thermal sensor 907 is selected. At 802, heater 901 generates a thermal pulse. At 803 the flying time of the thermal pulse between thermal sensors 902 and 907 is measured. At 804 velocity of the fluid flow is calculated according to the above equation (1). At 805, the velocity is compared with the measurable scope of thermal sensor 907 to determine whether it is within the measurable scope. If the determination is positive, the velocity value is output at 806; Otherwise, the second thermal sensor 906 next to thermal sensor 907 is selected at 807 and steps from 802 to 806 are repeated until the determination if positive.

TABLE I

| No. of thermal sensor | Distance (mm) | Measurable scope (sccm) |
| --- | --- | --- |
| 1 | 9680.0 | 200–160.3 |
| 2 | 6220.0 | 160.2–103.0 |
| 3 | 2580.0 | 103.0–42.7 |
| 4 | 460.0 | 42.7–7.6 |
| 5 | 20.0 | 7.6–0.3 |

EFFECTS OF THE INVENTION

As described above, positions of the thermal sensors may be determined such that necessary conditions including required resolution, full scale, errors in thermal pulses, maximum response time and minimum measurable velocity may be considered. In the micro flow sensor of this invention is applicable to a variety of measurable scopes, while the sectional area of the microchannel remained unchanged in all sections. The space needed is thus reduced, in comparison with that of the Jerman invention. In the micro flow sensor of this invention, thermal sensors are of the same size. Preparation of the device may be simplified. Since a thermal signal processor is shared by all thermal sensors, circuit design and processing of the circuit is again simplified. As the positions of the thermal sensors may be determined according to the actual conditions in the measurement, an ideal design of the flow sensor may be made to comply with all requirements in the measurement.

Of course, the invented method is applicable when flying time of a thermal pulse from the heater to a selected thermal sensor is used to calculate the fluid velocity. Necessary modifications may be made by those skilled in the art. Detailed description thereof is thus omitted.

As the present invention has been shown and described with reference to preferred embodiments thereof, those skilled in the art will recognize that the above and other changes may be made therein without departing from the spirit and scope of the invention.

What is claimed is:

1. A method for the preparation of a thermal pulsed micro flow sensor, comprising:

(A) preparing a microchannel to allow a fluid to flow through;

(B) determining randomly a position for a most upstream thermal sensor in said microchannel;

(C) determining a position for a most downstream thermal sensor in said microchannel according to the following equation:

$$\Delta F = (A^* L_n)^* \{1/T_n - 1/(T_n + \Delta T)\};$$

wherein $\Delta F$ represents accuracy in velocity measurement; A represents cross sectional area of the fluid channel; $T_n$ is flying time and $T_n = (A^* L_n)/F$ wherein F represents full scale of measurable velocity of $n^{th}$ thermal sensor and n represents number of thermal sensor counting from the most downstream one; and $\Delta T$ represents tolerance of the thermal pulse signals;

(D) calculating minimum measurable velocity ($F_n$min) of said most downstream thermal sensor according to the following equation:

$$F_n \text{min} = (A^* L_n)/R$$

wherein R represents the required maximum response time;

(E) determining whether a second thermal sensor next to said most downstream thermal sensor is needed by comparing $F_n$min with a threshold;

(F) outputting obtained L values, if no further thermal sensor is needed; otherwise, repeating said steps (C)–(E) by replacing F with the $F_{-1}$min value until no need of further thermal sensor is determined; and (G) positioning thermal sensors according to said determined positions.

2. A method for the preparation of a thermal pulsed micro flow sensor, comprising:

(A) preparing a microchannel to allow a fluid to flow through;

(B) positioning a most upstream thermal sensor at a position in said microchannel;

(C) positioning a most downstream thermal sensor at a position in said microchannel determined according to the following equation:

$$\Delta F = (A^* L_n)^* \{1/T_n - 1/(T_n + \Delta T)\};$$

wherein $\Delta F$ represents accuracy in velocity measurement; A represents cross sectional area of the fluid channel; $T_n$ is flying time and $T_n = (A^* L_n)/F$ wherein F represents full scale of measurable velocity of $n^{th}$ thermal sensor and n represents number of thermal sensor counting from the most downstream one; and $\Delta T$ represents tolerance of the thermal pulse signals;

(D) calculating minimum measurable velocity ($F_n$min) of said most downstream thermal sensor according to the following equation:

$$F_n \text{min} = (A^* L_n)/R$$

wherein R represents the required maximum response time;

(E) determining whether another thermal sensor next to said most downstream thermal sensor is needed by comparing $F_n$min with a threshold;

(F) if another thermal sensor is needed, positioning another thermal sensor at a position determined repeating steps (C)–(E) by replacing F with the $F_{n-1}$min value until no need of further thermal sensor is determined; otherwise, ending the steps.

3. A thermal pulsed micro flow sensor prepared according to the method of claim 1 or 2.

* * * * *